United States Patent
Kaja et al.

(10) Patent No.: US 11,232,179 B2
(45) Date of Patent: Jan. 25, 2022

(54) AUTOMATED USER IDENTIFICATION FOR CROSS-PLATFORM GROUP AND DEVICE COLLABORATION

(71) Applicant: Microsoft Technology Licensing, LLC, Redmond, WA (US)

(72) Inventors: Kiran Phani Kaja, Sammamish, WA (US); Ashutosh Kumar, Redmond, WA (US); Michael Thomas McLean, Snoqualmie, WA (US); Arjun Kumar Kalluri, Woodinville, WA (US); Nathaniel Trent Potter, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 318 days.

(21) Appl. No.: 16/362,339

(22) Filed: Mar. 22, 2019

(65) Prior Publication Data
US 2020/0302040 A1   Sep. 24, 2020

(51) Int. Cl.
*G06F 21/32* (2013.01)
*G06F 21/12* (2013.01)
*G06F 21/54* (2013.01)
*G06K 9/00* (2006.01)

(52) U.S. Cl.
CPC ............ *G06F 21/32* (2013.01); *G06F 21/121* (2013.01); *G06F 21/54* (2013.01); *G06K 9/00288* (2013.01)

(58) Field of Classification Search
CPC ........ G06F 21/32; G06F 21/121; G06F 21/54; G06F 2221/2141; G06K 9/00288; H04L 63/0861; H04L 63/104
See application file for complete search history.

(56) References Cited

U.S. PATENT DOCUMENTS

| 5,811,772 A * | 9/1998 | Lucero ............... G06Q 20/04 235/380 |
| 7,130,454 B1 | 10/2006 | Berube et al. |
| 7,849,507 B1 * | 12/2010 | Bloch ............... H04L 63/0236 726/22 |
| 9,055,062 B1 * | 6/2015 | Huang ............... H04W 12/06 |
| 10,484,818 B1 * | 11/2019 | Ensing ............... G06K 9/00778 |
| 2007/0239705 A1 * | 10/2007 | Hunt ............... G06F 21/6245 |

(Continued)

FOREIGN PATENT DOCUMENTS

| CN | 101833624 A | 9/2010 |
| JP | 2013178637 A * | 9/2013 |

OTHER PUBLICATIONS

"International Search Report and Written Opinion Issued in PCT Application No. PCT/US2020/022511", dated Jun. 30, 2020, 15 Pages.

*Primary Examiner* — Beemnet W Dada
*Assistant Examiner* — Rodney E. Haven

(57) ABSTRACT

In non-limiting examples of the present disclosure, systems, methods and devices for providing cross-device access to group features are presented. A facial image input may be received from a user. A determination may be made that the user is not associated with a group having access to one or more sets of features accessible from the device. An authorization request may be sent to an owner account associated with the device for adding the user to the group. A request to add the user to the group may be received via the authorization request. The user may be added to the group.

20 Claims, 10 Drawing Sheets

(56) References Cited

U.S. PATENT DOCUMENTS

| | | | |
|---|---|---|---|
| 2008/0275829 A1* | 11/2008 | Stull | H04L 9/00 706/17 |
| 2009/0259485 A1* | 10/2009 | Perlman | G06Q 50/01 705/319 |
| 2010/0058477 A1* | 3/2010 | Ciet | H04L 9/002 726/26 |
| 2010/0144323 A1* | 6/2010 | Collins | G06Q 10/10 455/414.1 |
| 2011/0178943 A1* | 7/2011 | Motahari | G06F 21/6254 705/325 |
| 2012/0030165 A1* | 2/2012 | Guirguis | G06F 16/283 707/607 |
| 2012/0158953 A1* | 6/2012 | Barnes | H04L 63/04 709/224 |
| 2013/0040629 A1* | 2/2013 | Sprigg | H04N 21/6181 455/419 |
| 2014/0115696 A1* | 4/2014 | Fadell | G06F 21/32 726/19 |
| 2016/0196414 A1 | 7/2016 | Stuntebeck et al. | |
| 2017/0201850 A1* | 7/2017 | Raleigh | G06F 3/0482 |
| 2018/0160894 A1* | 6/2018 | Gupta | A61B 3/107 |
| 2019/0205812 A1* | 7/2019 | Afzal | H04W 4/029 |

\* cited by examiner

AUTOMATED USER IDENTIFICATION FOR CROSS-PLATFORM GROUP AND DEVICE COLLABORATION

BACKGROUND

Facial recognition is becoming a common method of user authentication across software, devices, and services. Facial recognition has been implemented to identify users of various platforms. This functionality works well when authenticating individual users. However, a growing number of situations are resulting in a set of software services or devices being shared across a scoped group of individuals. This situation is encountered both in the enterprise and the consumer space.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing cross-device access to group features via facial recognition and authorization. User accounts may be associated with groups (e.g., personal groups, enterprise groups) and the groups may be associated with devices. Each group may have various features on shared devices that group members may access and/or policies that dictate how a device and its features can be accessed by group members. When a user attempts to access a device, the device and/or a facial recognition application/service may determine whether a facial image input from the user matches previously mapped facial features of a user associated with a user account. If there is a match, a determination may be made as to whether the user account is a member of a group that has access to features associated with the device. If so, the user may be authenticated and provided with access to the device based on the group permissions and/or policies for the device. In examples where the user cannot be matched to a user account based on the facial recognition, an owner/administrator of a device and/or group associated with the device may be prompted to grant or deny group access to the device. In some examples, the facial recognition application/service may suggest a group for adding the user to.

BRIEF DESCRIPTION OF THE DRAWINGS

Non-limiting and non-exhaustive examples are described with reference to the following figures.

DETAILED DESCRIPTION

Figure 1:
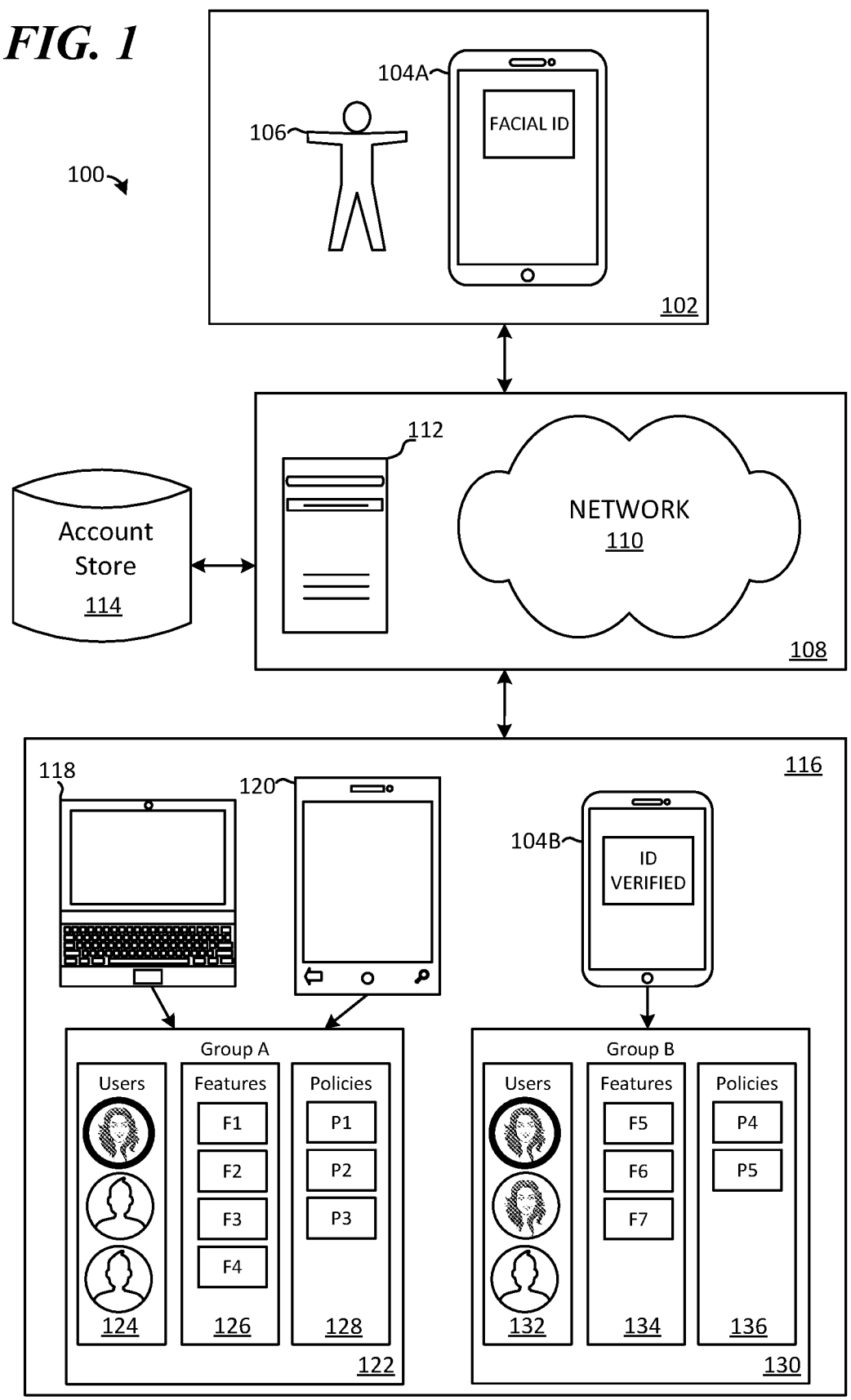
FIG. 1 is a schematic diagram illustrating an example distributed computing environment for providing cross-device access to group features via user identification and authentication.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for providing cross-device access to group features. The mechanisms described herein utilize facial recognition to match a user to one or more groups that have access to one or more devices. The authorized use of a device based on group access being validated may provide full access to the device and its features or limited access to the device and its features. According to some examples, if a user attempts to access a device and the user's facial image input does not match a user account associated with a group that has access to the device, a facial recognition application/service may query an owner/administrator of the device and/or a group with access to the device as to whether they would like to add the user to a group that has access to the device. In some examples, the facial recognition application/service may suggest a group for adding the user to based on analysis of one or more databases (e.g., a social network database, an electronic messaging database). Once a user has been verified via facial recognition as being associated with a group, that user may be provided with device (e.g., device unlock, basic hardware of device) and device feature access (e.g., access to various applications and application features) for one or more devices associated with the group.

The systems, methods, and devices described herein provide technical advantages for providing users with access to multiple devices and their various features. Memory and processing costs (CPU cycles) necessary for providing users with access to group devices are reduced by the mechanisms described herein at least in that users can be granted access to devices simply by having their facial image input mapped to a user account that is a member of a group that has access to a device. Thus, an administrator and/or owner of a device and/or group does not have to manually add each user as an authorized user of one or more group devices. Rather, users can be associated with multiple devices based simply on their group memberships. Time and resources associated with individually creating device and application policies for each user on each device are also reduced. Utilizing the mechanisms described herein, device policies can be mapped to groups, such that members of different groups may have separate policies enforced according to their group membership when they are authenticated for a device based on facial recognition.

FIG. 1 is a schematic diagram illustrating an example distributed computing environment 100 for providing cross-device access to group features via user identification and authentication. Computing environment 100 includes user identification sub-environment 102, network and processing sub-environment 108, and group access sub-environment 116. Any of the computing devices in computing environment 100 may communicate with one another via network 110.

User identification sub-environment 102 includes user 106 and computing device 104A. Computing device 104A has a camera integrated in it. User 106 may attempt to access computing device 104A. However, prior to user 106 gaining access to features accessible from computing device 104A, computing device 104A may require that user 106 be authenticated via facial recognition. In some examples, a facial recognition program may be integrated as part of the operating system installed on computing device 104A. In other examples, the facial recognition program may be a stand-alone application installed on computing device 104A. In still other examples, the facial recognition program/application may be executed all or in part on one or more remote computing devices, such as server computing device 112 in network and processing sub-environment 108, as part of a facial recognition service. Although the systems, methods and devices described herein are generally described in relation to "facial recognition" they may also be applied other anatomical features and/or anatomical movements (e.g., gait analysis, facial mannerisms, retina analysis, etc.).

When computing device 104A receives a facial image input from user 106 the facial identification application and/or service may determine whether that input matches facial features for a user account associated with one or both of computing device 104A and/or one or more groups that have features that can be accessed by computing device 104A. In some examples, the groups may be associated with the facial recognition application and/or service in addition to one or more other applications and/or services. In additional examples, the groups may be created directly in relation to the facial recognition application. For example, the owner or administrator of device 104A may setup a personal, or home, set of groups for device 104A if the device is a personal device. Examples of such groups may comprise a "kids" group and/or an "adults" group. In some examples, the "kids" group and the "adults" group may be encompassed in a "family" group. The members of each of the "kids" group and the "adults" group may have access to different sets of features on device 104A and have different policies assigned to them. For example, the "kids" group may only have access to a subset of applications on device 104A and/or only have access to a subset of features of those applications (e.g., certain websites may be restricted, certain movie rentals may be restricted, a daily time limit for device use may be set). Alternatively, if device 104A is a work or school device that is expected to be utilized by a plurality of users, an administrator of device 104A may setup groups for different work or school units (e.g., "accounting" group, "legal" group, "first grade" group, "Spanish class" group, etc.). Like the personal and/or home groups, each work and/or school group may have access to different applications and/or features and/or have different policies associated with it. It should thus be understood that, utilizing the shared group-device constructs that can be accessed via facial recognition as described herein, may allow users to gain access to certain software licenses at a lower cost than would otherwise be possible.

In the illustrated example, a facial recognition service operating in network and processing sub-environment 108 is in communication with account store 114. Account store 114 may store unique facial features for users and associate those features with one or more groups, which may have access to various features and/or have various policies tied to them as described above. Thus, when user 106 provides a facial image input to computing device 104A, that input may be transferred to the facial recognition service, which may then determine whether there is a matched account in account store 114. If there is a match, the facial recognition service may then determine whether user 106 is a member of any groups that have access to any features of device 104A. A group may have access to one or more devices and a device may be associated with one or more groups. Additionally, a user may be a member of one or more groups.

In this example, the facial recognition service has matched the facial image input from user 106 to two groups in account store 114. Specifically, a match has been found for user 106A as being associated with Group A 122 and Group B 130, as illustrated in group access sub-environment 116. Each of users 124 associated with Group A has access to two different devices, laptop computing device 118 and tablet computing device 120, as illustrated in group access sub-environment 116. One of the user icons is bolded in users 124 to illustrate that user 106 is a member of Group A. In addition to having access to laptop computing device 118 and tablet computing device 120 based on user 106's Group A membership, each member in Group A (including user 106) has access to a subset of features of those devices and/or applications on those devices. Specifically, users 124 have access to features 126 (F1, F2, F3, F4). Additionally, users 124 have a set of policies 128 (P1, P2, P3) that are applied to their use of those device and/or applications executed on those devices. The policies may include, for example, a limited duration of time that each user in Group A is allowed to access each of the devices, times of the day and/or night when those users are allowed to access each of the devices, and/or various application restrictions, etc. Although users 124 of Group A are illustrated as having access to the same set of features and having the same policies applied to them on both of laptop computing device 118 and tablet computing device 120, those features and policies may differ across devices for a group.

Each of users 132 associated with Group B has access to a single device—computing device 104B—which is the same computing device as computing device 104A in user identification sub-environment. One of the user icons is bolded in users 124 to illustrate that user 106 is a member of Group B. In addition to having access to computing device 104B based on user 106's Group B membership, each member in Group B (including user 106) has access to a subset of features on that device and/or applications on that device. Specifically, users 132 have access to features 134 (F5, F6, F7). Additionally, users 132 have a set of policies 136 that are applied to their use of device 104B and/or applications executed on device 104B. As discussed above, the policies may include, for example, a limited duration of time that each user in Group B is allowed to access device 104B, times of day and/or night when those users are allowed to access device 104B, and/or various application restrictions, etc.

Figure 2:
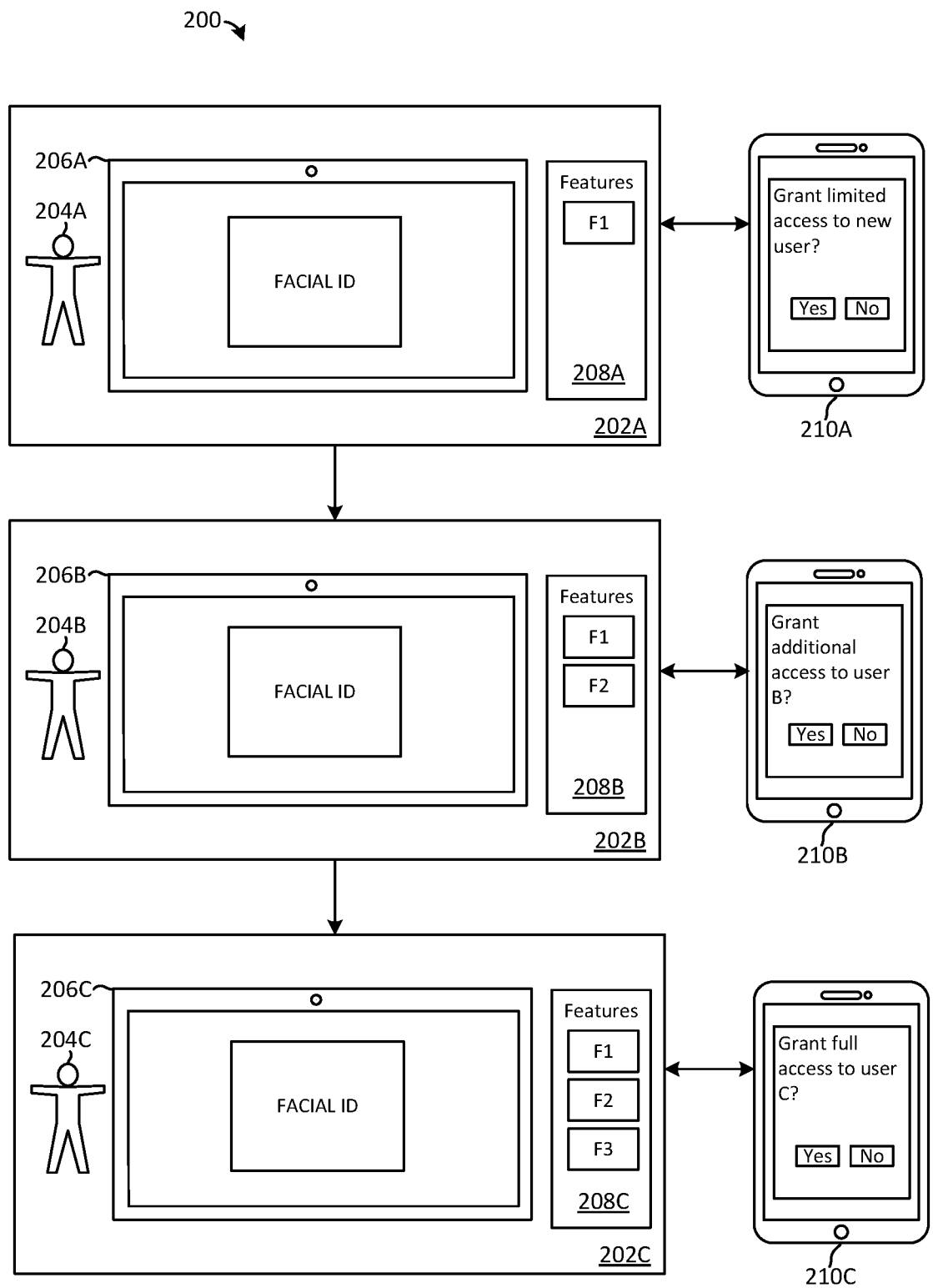
FIG. 2 illustrates an exemplary environment for providing cross-device access to group features in a progressive tiered manner via user identification and authentication.

FIG. 2 illustrates an exemplary environment 200 for providing cross-device access to group features in a progressive tiered manner via user identification and authentication. Environment 200 includes first user identification sub-environment 202A, second user identification sub-environment 202B and third user identification sub-environment 202C. Environment 200 also includes computing device 210A, computing device 210B and computing device 210C, which are all the same computing device being accessed at different times. Similarly, user 204A, 204B and 204C are all the same user attempting to access a computing device at different times. Likewise, computing device 206A, 206B and 206C are all the same computing device attempting to be accessed by user 204A-204C.

User 204A is attempting to access computing device 206A in first user identification sub-environment 202A. A camera on computing device 206A receives a facial image input from user 204A. In some examples a facial recognition application on computing device 206A and/or a facial recognition service executed on one or more remote computing devices may perform a facial recognition match analysis to determine whether the facial image input from user 204A matches a user account associated with one or more groups that have access to one or more features of, or executed on, computing device 206A.

In the illustrated example, the facial recognition application/service makes a determination that user 204A is not associated with any such group. That being the case, the facial recognition application/service may send an authorization query to an account and/or device associated with the owner and/or administrator of computing device 206A and/or a group that has access to computing device 206A. In this example, the facial recognition application/service sends the authorization query to computing device 210A, which states: "Grant limited access to new user?" "Yes" "No".

Thus, the owner and/or administrator of computing device 206A (or an owner/administrator of a group that has access to computing device 206A) may select "Yes" on computing device 210A to add user 204A to a group with limited access on computing device 206A, or "No" to deny access to user 204A. In this example, the owner/administrator has selected "Yes" and added user 204A to a group with limited access to device 206A, which is illustrated by features 208A in first user identification sub-environment 202A. Thus, in this example, user 204A is granted with access to a single feature (F1) of computing device 206A. Although not shown, in some examples, the message that is sent to the owner/administrator when a user with no matched account/group attempts to access a corresponding device may include a display of the facial image input from the user, a name of the user, and/or additional information that the user attempting to access the device may provide. In some examples, a new "limited access" group may be created when the owner/administrator grants limited access to user 204A. In other examples, if a "limited access" group already exists with members, user 204A may simply be added to that existing group. While the "grant limited access to new user" query is provided by way of example here, other options may be presented as should be understood by one of skill in the art. For example, because user 204A is not associated with any groups, the facial recognition application/service may present an option to the owner/administrator to configure access rules for a new user (i.e., user 204A). In such an example, the owner/administrator may select that option and be presented with one or more configurable access options that can be granted to user 204A.

User 202B is attempting to access computing device 206B a second time as illustrated in second user identification sub-environment 202B after previously gaining limited access to it via a limited access group authorization as described above in relation to first user identification sub-environment 202A. A camera on computing device 206B receives a facial image input from user 204B. In some examples, a facial recognition application on computing device 206B and/or a facial recognition service executed on one or more remote computing devices may perform a facial recognition match analysis to determine whether the facial image input from user 204B matches a user account associated with one or more groups that have access to one or more features of, or executed on, computing device 206B.

In the illustrated example, the facial recognition application/service makes a determination that user 204B is a member of a "limited access" group having limited access to features on computing device 206B. In some examples, the facial recognition application/service may simply allow user 204B to access computing device 206B with the limited access granted to the "limited access" group. In other examples, the facial recognition application/service may have deleted the user from the "limited access" group and the user may have to be added to the group again to gain access to computing device 206B. In other examples, if a user attempts to access a device with a specified frequency, a specified number of times, and/or an owner/administrator of the device has granted the user with limited access to the device a specified number of times, the facial recognition application/service may send an authorization query to the device's owner/administrator and have the owner/administrator decide whether the user should be added to a group that has access to additional features on the device since the user appears to be at least somewhat trusted. In this example, the facial recognition application/service sends the authorization query to computing device 210B, which states: "Grant additional access to user C?" "Yes" "No".

Thus, the owner and/or administrator of computing device 206B (or an owner/administrator of a group that has access to computing device 206B) may select "Yes" on computing device 210B to add user 204B to a group with additional access on computing device 206B, or "No" to deny access to user 204B. In some examples, if the owner/administrator selects the "No" option, the owner may be presented with one or more specific options related to that denial of access (e.g., does the denial disallow user 204B access permanently, does the denial disallow user 204B only for this access attempt, will the owner/administrator be notified of user 204B's future access attempts if user 204B is placed on a "blocked" list, etc.) In this example, the owner/administrator has selected "Yes" and added user 204B to a group with additional access to device 206B, which is illustrated by features 208B in second user identification sub-environment 202B. Thus, in this example, user 204B is granted with access to two features (F1 and F2) of computing device 206B.

User 202C is attempting to access computing device 206C a third time as illustrated in third user identification sub-environment 202C after previously gaining limited access to it via a limited access group authorization as described above in relation to first user identification sub-environment 202A and an additional access group authorization as described above in relation to second user identification sub-environment 202B. A camera on computing device 206C receives a facial image input from user 204C. In some examples, a facial recognition application on computing device 206C and/or a facial recognition service executed on one or more remote computing devices may perform a facial recognition match analysis to determine whether the facial image input from user 204C matches a user account associated with one or more groups that have access to one or more features of, or executed on, computing device 206C.

In this illustrated example, the facial recognition application/service makes a determination that user 204C is a member of an "additional access" group having access to a subset of features accessible by computing device 206B (i.e., F1 and F2). In some examples, the facial recognition application/service may simply allow user 204C to access computing device 206C with the limited access granted to the "additional access" group. In other examples, the facial recognition application/service may have deleted the user from the "additional access" group and the user may have to be added to the group again to gain access to computing device 206C. In other examples, if a user attempts to access a device with a specified frequency, a specified number of times, and/or an owner/administrator of the device has granted the user with access to a subset of features of the device a specified number of times, the facial recognition application/service may send an authorization query to the device's owner/administrator and have the owner/administrator decide whether the user should be added to a group that has full access to the device and its features since the user appears to be trusted. In this example, the facial recognition application/service sends the authorization query to computing device 210C, which states: "Grant full access to user C?" "Yes" "No".

Thus, the owner and/or administrator of computing device 206C (or an owner/administrator of a group that has access to computing device 206C) may select "Yes" on computing device 210C and add user 204C to a group with full access on computing device 206C, or "No" to deny access to user 204C. In this example, the owner/administrator has selected "Yes" and added user 204C to a group with additional access to device 206C, which is illustrated by features 208C in third user identification sub-environment 202C. Thus, in this example, user 204C is granted with access to a full set of features 205C of computing device 206B (i.e., F1, F2, F3).

Figure 3:
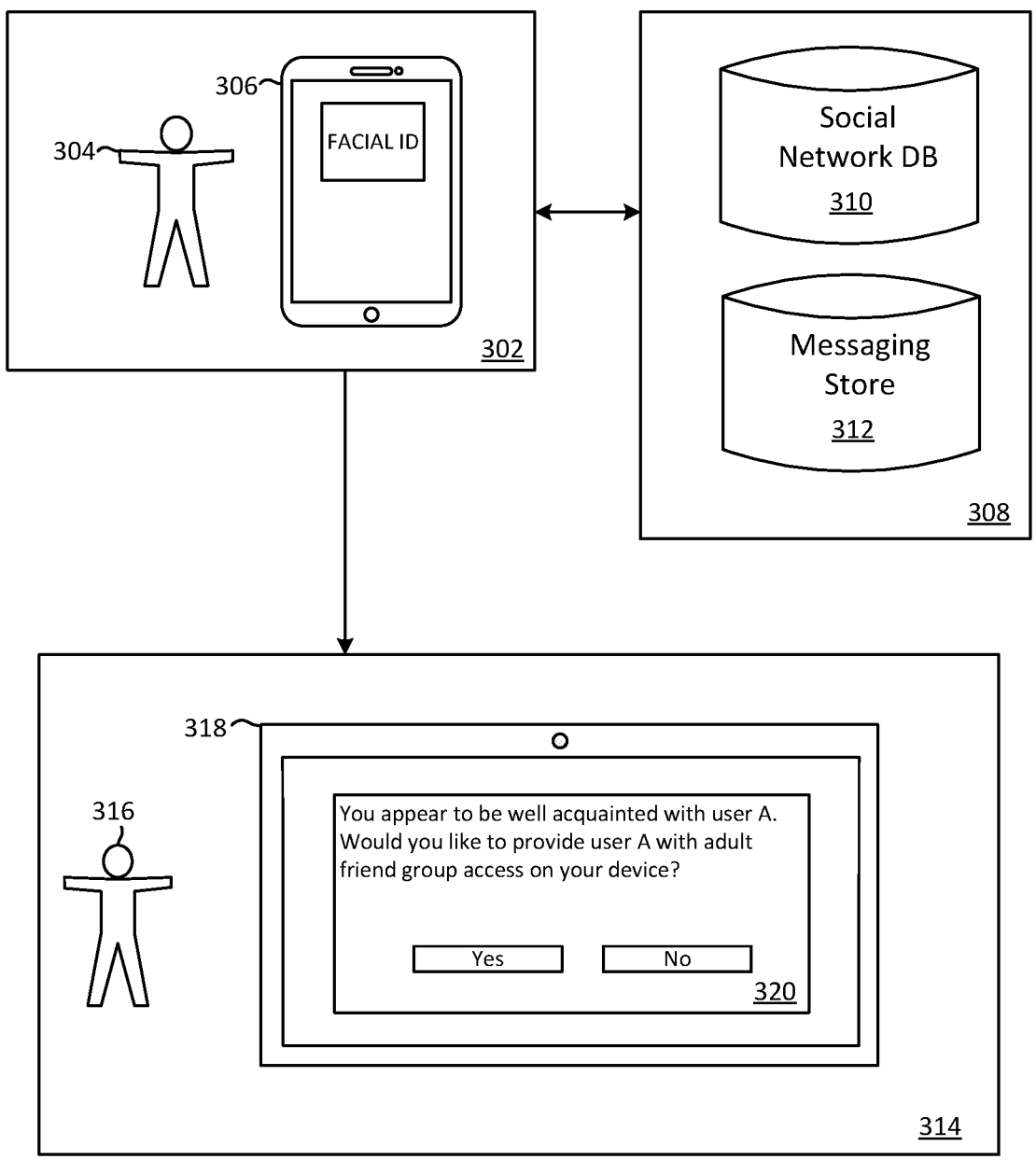
FIG. 3 illustrates the utilization of a social network database and an electronic messaging store for providing automated suggestions for adding users to groups via facial identification.

FIG. 3 is an exemplary environment 300 illustrating the utilization of a social network database 310 and an electronic messaging store 312 for providing automated suggestions for adding users to groups via facial identification. Exemplary environment 300 includes facial identification sub-environment 302, database sub-environment 308 and new group user sub-environment 314. Facial identification sub-environment includes user 304 and computing device 306. User 304 is attempting to access one or more features of computing device 306. Prior to allowing user 306 to access the features, a facial recognition application and/or facial recognition service (which may be executed on computing device 306, on one or more remote computing devices, or partially on computing device 306 and partially on one or more remote computing devices) may receive a facial image input from user 304 and attempt to match the user's features to a user account that is a member of a group that has access to one or more features of computing device 306.

In this example, user 304 has not previously attempted to access computing device 306 and/or user 304 has not previously been added to a group that has access to computing device 306. As such, the facial recognition application/service does not find a match for user 304. The facial recognition application/service may have access to one or more databases that it can analyze to determine a relationship between an owner/administrator of computing device 306 and/or an administrator of a group that has access to computing device 306. In examples, an owner/administrator of a computing device such as computing device 306 and/or a user being authenticated by a computing device such as computing device 306 may have to specifically authorize the facial recognition application/service to analyze their social network data and/or electronic messaging data to determine relationships amongst the parties.

In this example, the facial recognition application/service has been granted access to social network database 310, which may include data from one or more online social networks (e.g., LinkedIn, Yammer) that can be analyzed to determine a relationship between user 304 and an owner/administrator of computing device 306 and/or one or more users that are members of a group that has access to computing device 306. Similarly, the facial recognition application/service has been granted access to messaging store 312, which may include data from one or more electronic messaging applications/services (e.g., Outlook, Skype, Teams) that can be analyzed to determine a relationship between user 304 and an owner/administrator of computing device 306 and/or one or more users that are members of a group that has access to computing device 306. In some examples, the facial recognition application/service may analyze a frequency and/or number of communications between users to determine how "close" a relationship between users is. In additional examples, the facial recognition application/service may apply one or more natural language processing models to user communications from messaging store 312 to determine how "close" a relationship between users is.

The facial recognition application/service in exemplary environment 300 has, via analysis of data from one or both of social network database 310 and electronic messaging store 312, made a determination that the owner/administrator 316 of computing device 306 and/or a group that has access to computing device 306, and user 304, are well acquainted. As such, the facial recognition application/service has sent owner/administrator 316 a message 320 for potentially adding user 304 to a group that has access to one or more features of computing device 306. That message is displayed on computing device 318 in new group user sub-environment 314 and states: "You appear to be well acquainted with user A. Would you like to provider user A with adult friend group access on your device?" "Yes" "No". Owner/administrator 316 can select "Yes" to provide user 304 with access to the features of computing device 306 authorized by the "adult friend" group. Alternatively, owner/administrator 316 can select "No" to deny user 304 with access to computing device 306. In some examples, although not shown, owner/administrator 316 may be presented with additional options and/or owner/administrator 316 may reply back with a response that provides user 304 with access to the computing device based on adding user 304 to a different group (i.e., not the group that the facial recognition application/service initially suggested). In some examples, a machine learning model utilized for determining what groups to suggest for adding new users to may be trained via a feedback loop by owners/administrators replying to suggestions and/or modifying groups that have been suggested for adding new users to.

Figure 4:
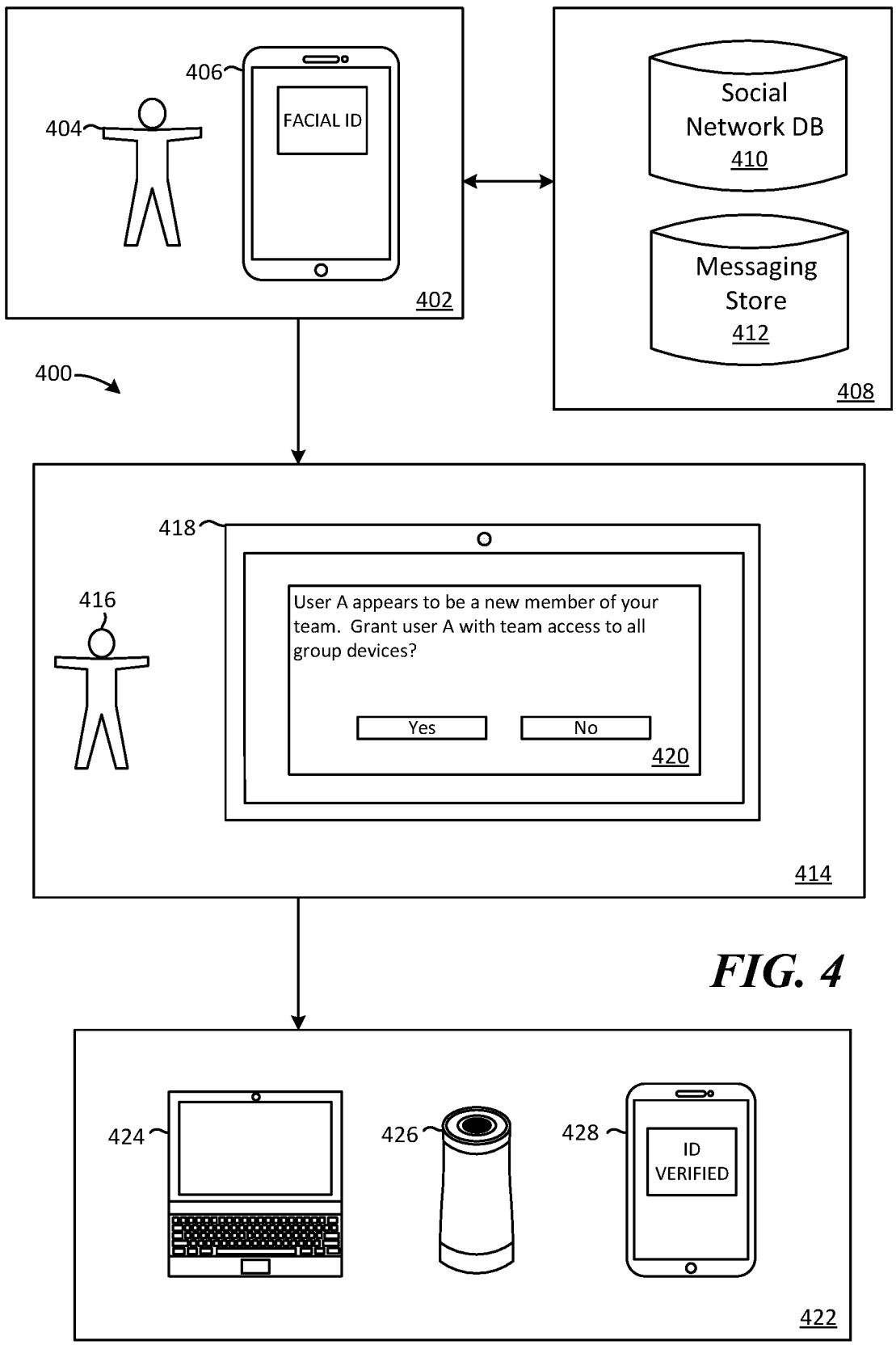
FIG. 4 illustrates the utilization of a social network database and an electronic messaging store for providing automated suggestions for allowing users to access group features associated with multiple devices.

FIG. 4 is an exemplary environment 400 illustrating the utilization of a social network database 410 and an electronic messaging store 412 for providing automated suggestions for allowing users to access group features associated with multiple devices. Exemplary environment 400 includes facial identification sub-environment 402, database sub-environment 408, new group user sub-environment 414 and group devices sub-environment 422. Facial identification sub-environment includes user 404 and computing device 406. User 404 is attempting to access one or more features of computing device 406. Prior to allowing user 406 to access the features, a facial recognition application and/or facial identification service (which may be executed on computing device 406, on one or more remote computing devices, or partially on computing device 406 and partially on one or more remote computing devices) may receive a facial image input from user 404 and attempt to match the user's features to a user account that is a member of a group that has access to one or more features of computing device 406.

In this example, user 404 has not previously attempted to access computing device 406 and/or user 404 has not previously been added to a group that has access to computing device 406. As such, the facial recognition application/service does not find a match for user 404. The facial recognition application/service may have access to one or more databases that it can analyze to determine a relationship between an owner/administrator of computing device 406 and/or an administrator of a group that has access to computing device 406. In examples, an owner/administrator of a computing device such as computing device 406 and/or a user being authenticated by a computing device such as computing device 406 may have to specifically authorize the facial recognition application/service to analyze their social network data and/or electronic messaging data to determine relationships amongst the parties.

In this example, the facial recognition application/service has been granted access to social network database 410, which may include data from one or more online social networks (e.g., LinkedIn, Yammer) that can be analyzed to determine a relationship between user 404 and an owner/administrator of computing device 406 and/or one or more users that are members of a group that has access to computing device 406. Similarly, the facial recognition application/service has been granted access to messaging store 412, which may include data from one or more electronic messaging applications/services (e.g., Outlook, Skype, Teams) that can be analyzed to determine a relationship between user 404 and an owner/administrator of computing device 406 and/or one or more users that are members of a group that has access to computing device 406. In some examples, the facial recognition application/service may analyze a frequency and/or number of communications between users to determine how "close" a relationship between users is. In additional examples, the facial recognition application/service may apply one or more natural language processing models to user communications from messaging store 412 to determine how "close" a relationship between users is.

The facial recognition application/service in exemplary environment 400 has, via analysis of data from one or both of social network database 410 and electronic messaging store 412, made a determination that user 404 is a member of a work group that user 416 is the administrator for. As such, the facial recognition application/service has sent user 416 message 420, which states: "User A appears to be a new member of your team. Grant user A with team access to all group devices?" "Yes" "No". In this example, the team that user 416 is the administrator for (and that the facial recognition application/service is asking user 416 to add user 404 to) has a plurality of shared devices as illustrated in group devices sub-environment 422. Group devices sub-environment includes laptop computing device 424, audio digital assistant computing device 426 and computing device 428, which is the same computing device as computing device 406. Thus, if user 416 selects "Yes" in message 420, user 404 will be added to the "team" group and provided with access to features accessible to the "team" group on each of laptop computing device 424, audio digital assistant computing device 426, and computing device 428. User 404 may then access each of those devices via facial identification, if available on those devices. Alternatively, if user 416 selects "No" in message 420, user 404 will not be provided with access to any of those devices, including computing device 406/428.

Figure 5A:
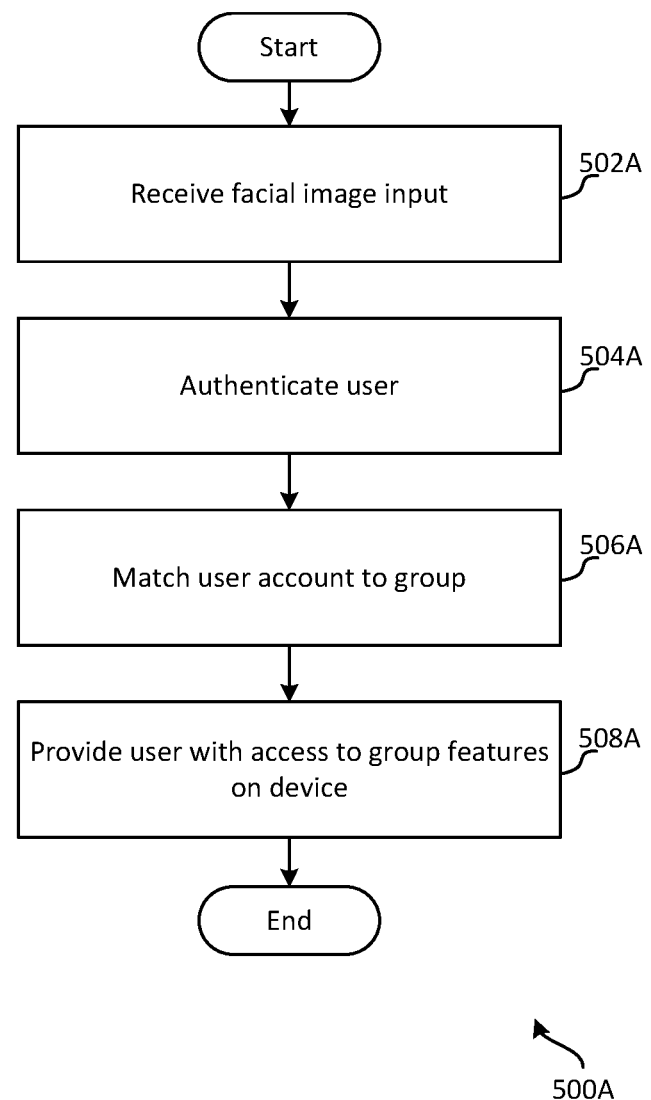
FIG. 5A is an exemplary method for providing cross-device access to group features via user identification and authentication.

FIG. 5A is an exemplary method 500A for providing cross-device access to group features via user identification and authentication. The method 500A begins at a start operation and flow continues to operation 502A.

At operation 502A a facial image input from a user is received. The user may be attempting to access one or more features of a device with a camera and the camera may capture the user's image for facial recognition and/or authentication purposes.

From operation 502A flow continues to operation 504A where the user is authenticated to a user account based on the facial image input. The user account may be associated with a facial recognition application and/or service. In other examples the user account may be tied to one or more separate services (e.g., a productivity application suite service). In examples, the facial image input may be authenticated by matching one or more features of the facial image input to one or more features of a previously-mapped facial image input that has been associated with a user account.

From operation 504A flow continues to operation 506A where the user account is matched to a group that has access to a subset of features on the device. In examples, there may be a plurality of groups associated with the device and each of the plurality of groups may have access to a different subset of features on the device. The group may be a personal group (e.g., a "home" group, a "family" group, a "kids" group, an "adults" group) or an enterprise group (e.g., an "accounting" group, a "human resources" group, a "seventh grade" group, a "match class" group, etc.). In some examples, the group may be associated with and have access to a plurality of devices.

From operation 506A flow continues to operation 508A where the user is provided with access on the device to the subset of features corresponding to the matched group. For example, the group may have access to one or more hardware features, application features, etc. In some examples, the group may also be associated with one or more policies for accessing the device. For example, members of a group may have duration of duration of time limitations associated with device use, time of use (time of day or night) limitations associated with device use, accessible content limitations, etc.

From operation 508A flow continues to an end operation and the method 500A ends.

Figure 5B:
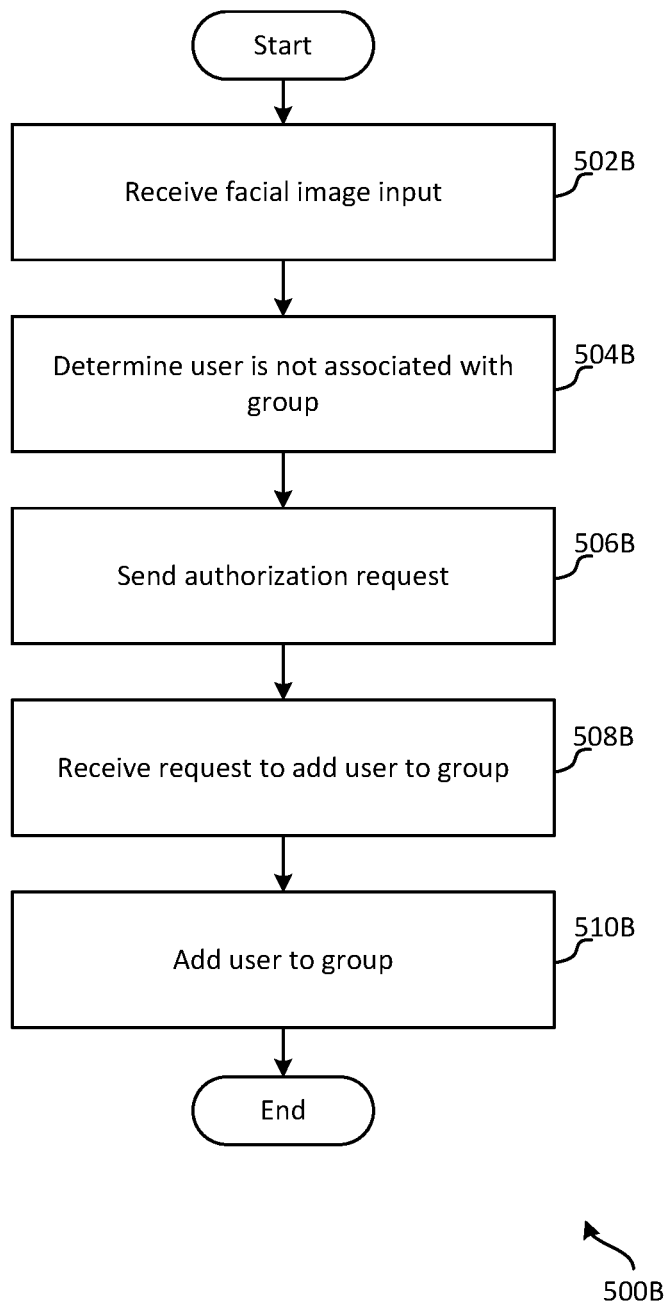
FIG. 5B is another exemplary method for providing cross-device access to group features via user identification and authentication.

FIG. 5B is another exemplary method 500B for providing cross-device access to group features via user identification and authentication. The method 500B begins at a start operation and flow continues to operation 502B.

At operation 502B a facial image input is received from a user. The user may be attempting to access one or more features of a device with a camera and the camera may capture the user's image for facial recognition and/or authentication purposes.

From operation 502B flow continues to operation 504B where a determination is made, based on the input, that the user is not associated with a group having access to one or more sets of features accessible from the device. A facial recognition application/service may attempt to match one or more facial features of the facial image input to one or more previously mapped features for users associated with a plurality of user accounts. In this example, the facial recognition application/service does not find a match.

From operation 504B flow continues to operation 506B where an authorization request is sent to an owner account associated with the device for adding the user to the group. In other examples the authorization request may be sent to an administrator of the device and/or a group associated with the device. In some examples, the request may be sent regardless of whether the user has attempted to access the device previously and/or regardless of whether the owner/administrator has granted the user with access to the device in the past. In other examples, the authorization request may only be sent if the user has been granted with access to the device previously. In still additional examples, the authorization request may only be sent if the user has been granted with access to the device a threshold number of times or with a minimum frequency (e.g., granted access three times in a week, granted access for five consecutive weeks, etc.). The authorization request may include an option to add the user to a group that has access to one or more features of the device. In some examples, a group for adding the user to may be suggested in the request based on analysis of one or more data sets (e.g., online social network data, electronic messaging data). In some examples, a reputation score for the user may be calculated based on a social network proximity of the user to the owner/administrator and/or one or more group members based on analysis of relationship information and communications identified in the online social network data and/or the electronic messaging data.

From operation 506B flow continues to operation 508B where a request is received, via the authorization request, to add the user to the group. For example, the owner/administrator that received the authorization request may select a "Yes" option to add the user to a suggested group. In other examples, the owner/administrator may reply to the authorization with a written and/or verbal response.

From operation 508B flow continues to operation 510B where the user is added to the group. The user is then provided with access to the device and any features on the device that the group has access to.

From operation 510B flow moves to an end operation and the method 500B ends.

Figure 6:
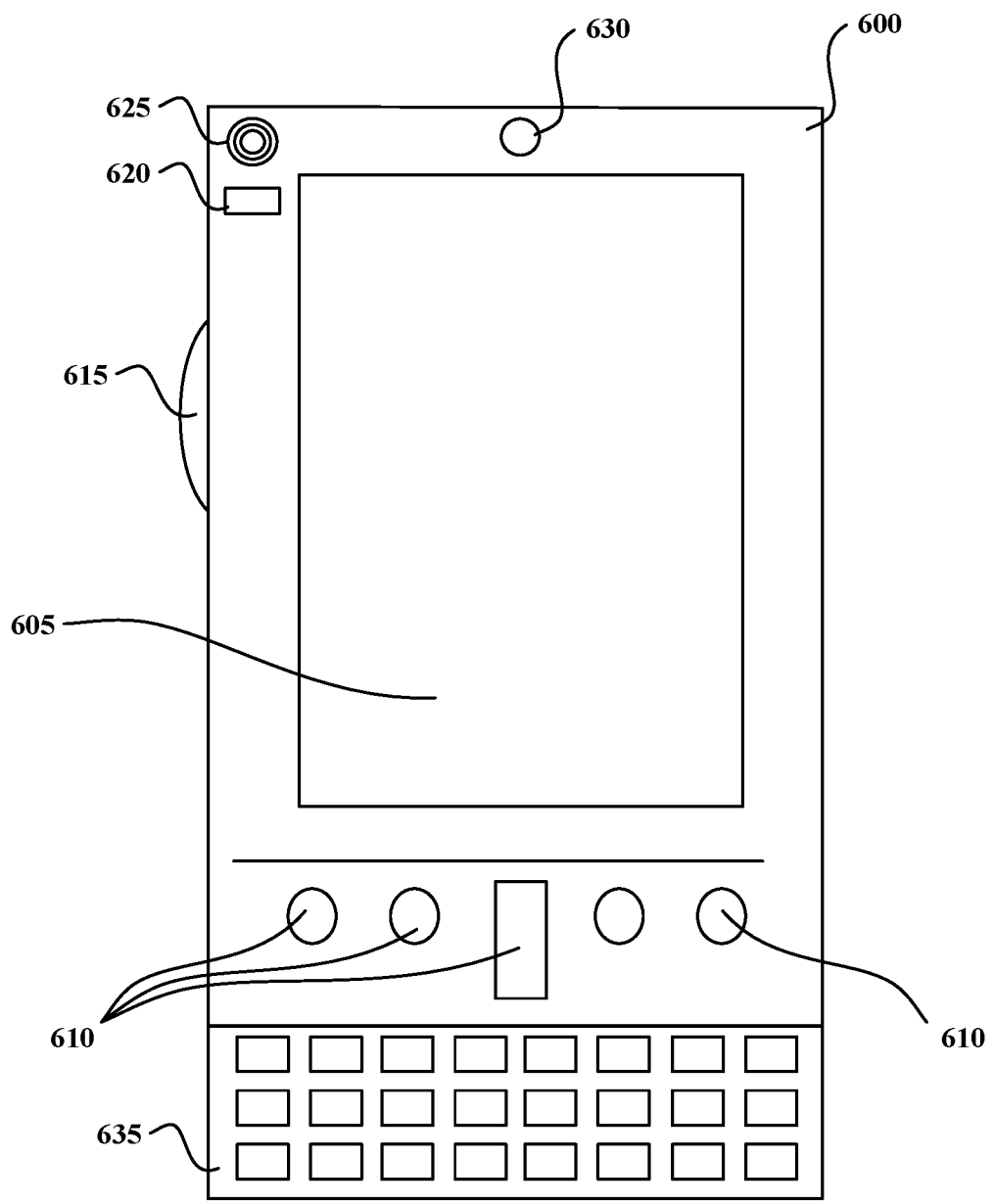
FIGS. 6 and 7 are simplified diagrams of a mobile computing device with which aspects of the disclosure may be practiced.
Figure 7:
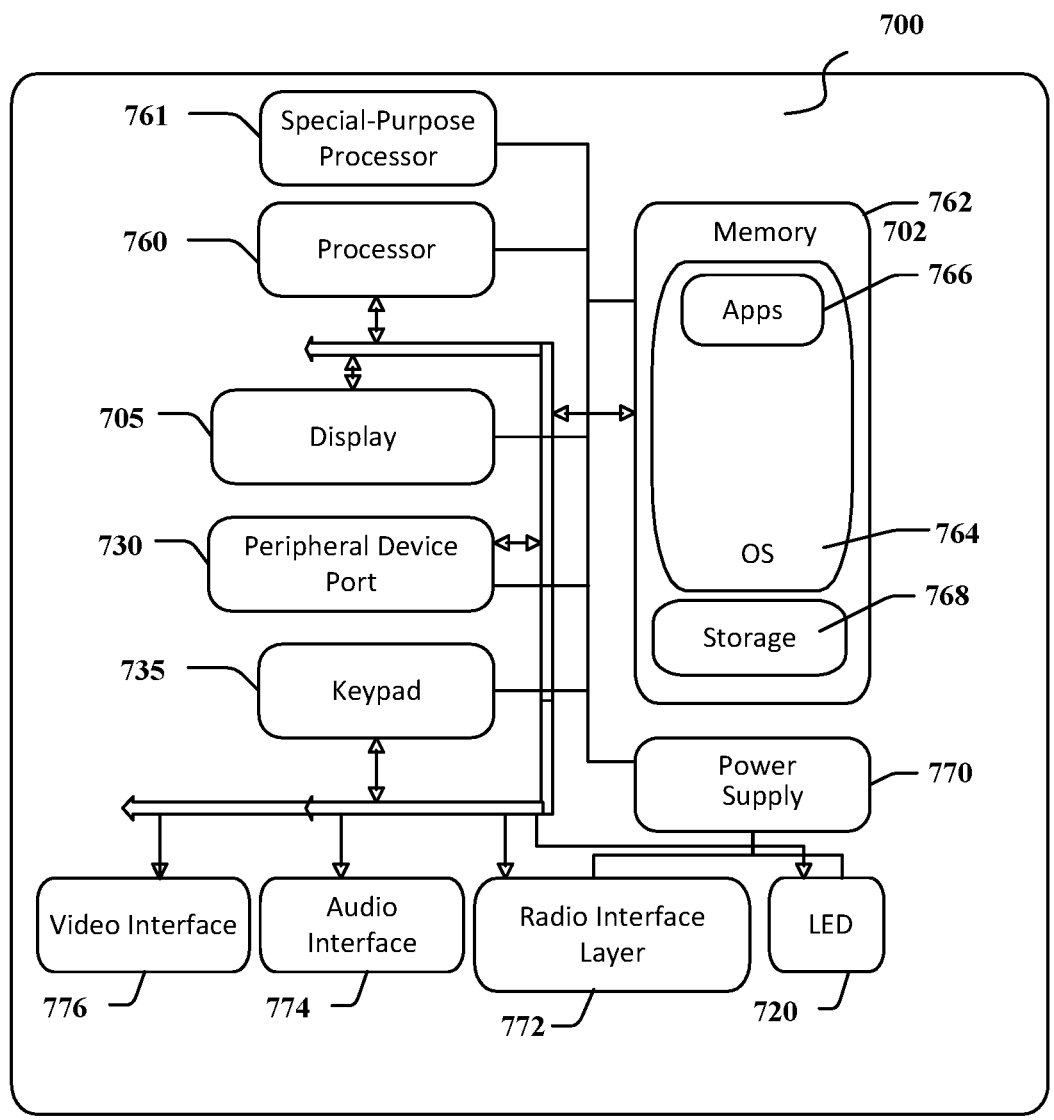

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device

700, including instructions for providing and operating a digital assistant clustering computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
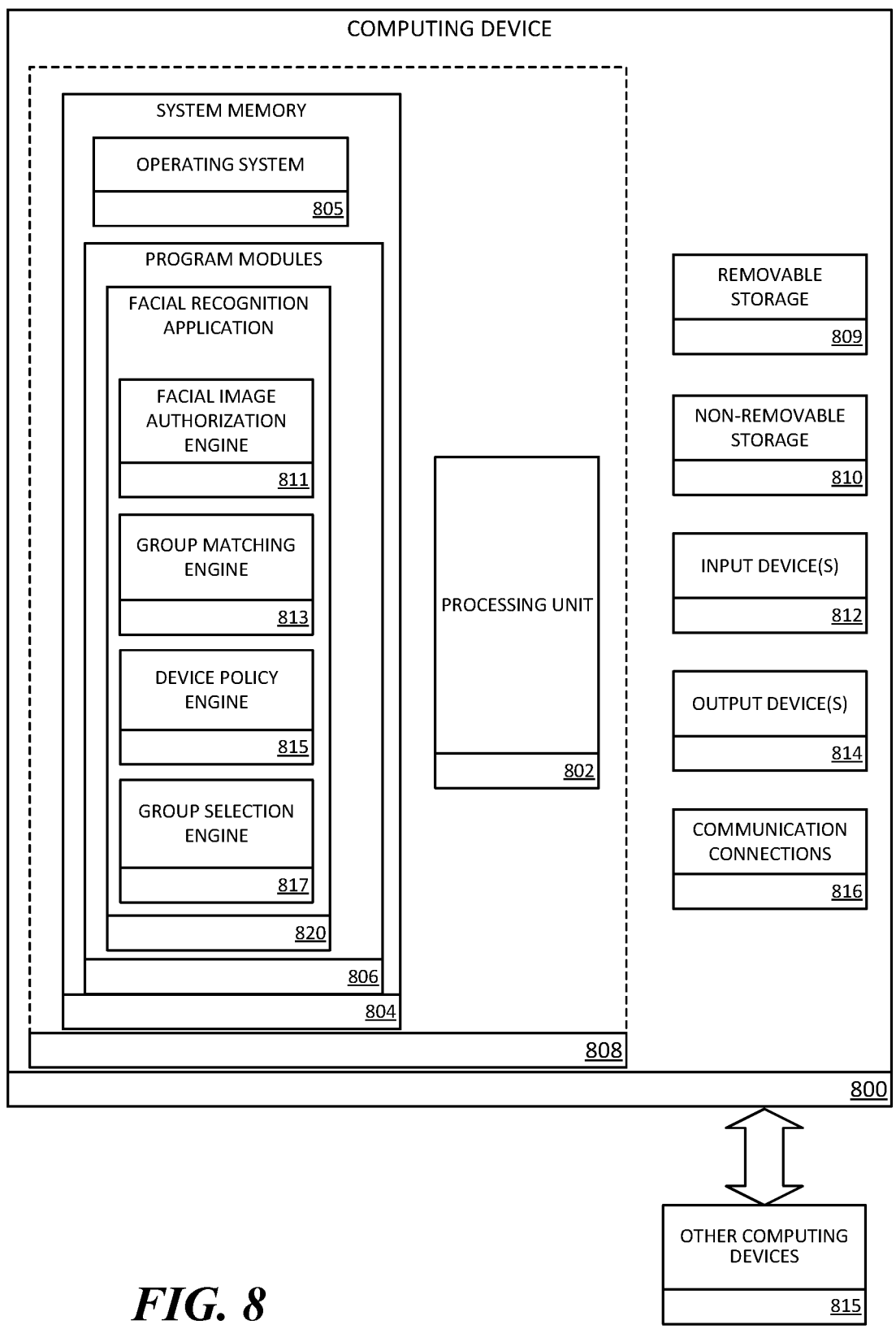
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for providing cross-device access according to group membership and facial recognition authorization. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running facial recognition and device authorization programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., facial recognition application 820) may perform processes including, but not limited to, the aspects, as described herein. According to examples, facial image authorization engine 811 may perform one or more operations associated with matching features of a facial image input to a previously mapped facial image. Group matching engine 813 may perform one or more operations associated with identifying one or more groups and associated devices based on a matched user account that has been identified utilizing facial image authorization. Device policy engine 815 may apply one or more policies for device use based on a group that has been matched to a user account. Group selection engine 817 may perform one or more operations associated with identifying a social network proximity and/or a reputation score of users and suggesting a group for adding users to based on that social network proximity and/or reputation score.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
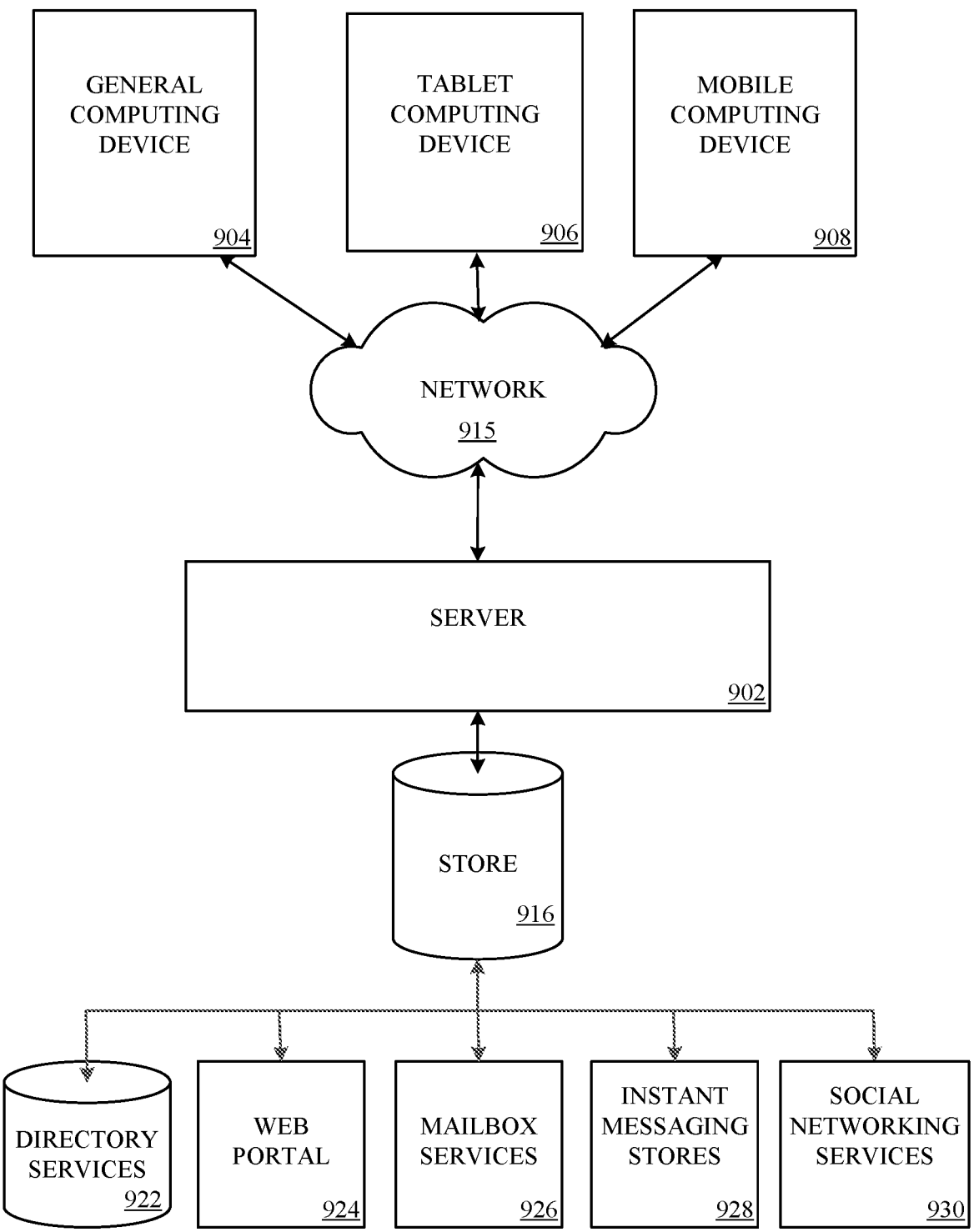
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for providing cross-device access to group features, comprising:
   a memory for storing executable program code; and
   one or more processors, functionally coupled to the memory, the one or more processors being responsive to computer-executable instructions contained in the program code and operative to:
   receive a facial image input of a user from a device;
   determine based on the facial image input that the user is not associated with any group having access to one or more sets of features accessible from the device;
   determine, utilizing the facial image input, a relationship between the user and a user corresponding to an owner account associated with the device based on analyzing at least one of: online social network data, and electronic messaging data;
   determine a group to suggest for adding the user to based on the determined relationship;
   send an authorization request to the owner account associated with the device for adding the user to the determined group, wherein the authorization request comprises the facial image input from the user;

present, based on the determination that the user is not associated with any group having access to one or more sets of features accessible from the device, an option for the owner account to configure access rules for the user;

receive a request, via the authorization request, to add the user to the determined group; and add the user to the determined group.

2. The system of claim 1, wherein in adding the user to the determined group the one or more processors are further responsive to the computer-executable instructions contained in the program code and operative to:

create a user account for the user accessible from the device via a facial image input of the user.

3. The system of claim 1, wherein the one or more processors are further responsive to the computer-executable instructions contained in the program code and operative to:

provide the user with access to one or more features associated with the determined group on a plurality of devices upon authenticating the user via facial recognition on each corresponding one of the plurality of devices.

4. The system of claim 1, wherein the authorization request comprises one or more selectable policies for use of one or more features accessibly by the determined group by the user.

5. The system of claim 4, wherein the one or more selectable policies comprise at least one of: a time limit use on the device policy; and an accessible content type policy.

6. The system of claim 1, wherein the authorization request is sent based on the user having previously been granted limited access to the device a threshold number of times.

7. The system of claim 1, wherein the authorization request is sent based on the user having previously been granted limited access to the device on a threshold number of consecutive days.

8. The system of claim 1, wherein the authorization request is sent based on the user having a reputation score over a threshold value.

9. The system of claim 8, wherein the reputation score is based, at least in part, on a social network proximity to a user corresponding to the owner account.

10. A computer-readable storage device comprising executable instructions that, when executed by one or more processors, assist with providing cross-device access to group features, the computer-readable storage device including instructions executable by the one or more processors for:

receiving a facial image input of a user from a device;

determining based on the facial image input that the user is not associated with any group having access to one or more sets of features accessible from the device;

determining, utilizing the facial image input, a relationship between the user and a user corresponding to an owner account associated with the device based on analyzing at least one of: online social network data, and electronic messaging data;

determining a group to suggest for adding the user to based on the determined relationship;

sending an authorization request to an owner account associated with the device for adding the user to the determined group, wherein the authorization request comprises the facial image input from the user;

presenting, based on the determination that the user is not associated with any group having access to one or more sets of features accessible from the device, an option for the owner account to configure access rules for the user;

receiving a request, via the authorization request, to add the user to the determined group; and adding the user to the determined group.

11. The computer-readable storage device of claim 10, wherein adding the user to the determined group comprises creating a user account for the user accessible from the device via a facial image input of the user.

12. The computer-readable storage device of claim 10, wherein the instructions are further executable by the one or more processors for:

providing the user with access to one or more features associated with the determined group on a plurality of devices upon authenticating the user via facial recognition on each corresponding one of the plurality of devices.

13. The computer-readable storage device of claim 10, wherein the authorization request comprises one or more selectable policies for use of one or more features accessible by the determined group by the user.

14. The computer-readable storage device of claim 13, wherein the one or more selectable policies comprise at least one of: a time limit use on the device policy; and an accessible content type policy.

15. The computer-readable storage device of claim 14, wherein the authorization request is sent based on the user having previously been granted limited access to the device a threshold number of times.

16. The computer-readable storage device of claim 14, wherein the authorization request is sent based on the user having previously been granted limited access to the device on a threshold number of consecutive days.

17. A computer-implemented method for providing cross-device access to group features, the computer-implemented method comprising:

receiving a facial image input of a user from a device;

determining based on the facial image input that the user is not associated with any group having access to one or more sets of features accessible from the device;

determining, utilizing the facial image input, a relationship between the user and a user corresponding to an owner account associated with the device based on analyzing at least one of: online social network data, and electronic messaging data;

determining a group to suggest for adding the user to based on the determined relationship;

sending an authorization request to the owner account associated with the device for adding the user to the determined group, wherein the authorization request comprises the facial image input from the user;

presenting, based on the determination that the user is not associated with any group having access to one or more sets of features accessible from the device, an option for the owner account to configure access rules for the user;

receiving a request, via the authorization request, to add the user to the determined group; and adding the user to the determined group.

18. The computer-implemented method of claim 17, wherein adding the user to the determined group comprises creating a user account for the user accessible from the device via a facial image input of the user.

19. The computer-implemented method of claim 17, further comprising:
    providing the user with access to one or more features associated with the determined group on a plurality of devices upon authenticating the user via facial recognition on each corresponding one of the plurality of devices.

20. The computer-implemented method of claim 17, wherein the authorization request comprises one or more selectable policies for use of one or more features accessible by the determined group by the user.

* * * * *